US012754417B2

(12) United States Patent
Matsushima et al.

(10) Patent No.: US 12,754,417 B2
(45) Date of Patent: Oct. 6, 2026

(54) IDENTIFICATION SYSTEM

(71) Applicant: NTT DOCOMO, INC., Tokyo (JP)

(72) Inventors: Nobutaka Matsushima, Chiyoda-ku (JP); Yuuichi Mizukoshi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/854,737

(22) PCT Filed: Mar. 14, 2023

(86) PCT No.: PCT/JP2023/009935

§ 371 (c)(1),
(2) Date: Oct. 7, 2024

(87) PCT Pub. No.: WO2023/210195

PCT Pub. Date: Nov. 2, 2023

(65) Prior Publication Data

US 2026/0029642 A1 Jan. 29, 2026

(30) Foreign Application Priority Data

Apr. 28, 2022 (JP) ................................ 2022-074533

(51) Int. Cl.
*G02B 27/00* (2006.01)
*G02B 27/01* (2006.01)
*G06F 3/01* (2006.01)

(52) U.S. Cl.
CPC ....... *G02B 27/0093* (2013.01); *G02B 27/017* (2013.01); *G02B 27/0179* (2013.01);
(Continued)

(58) Field of Classification Search
CPC .............. G02B 27/0093; G02B 27/017; G02B 27/0179; G02B 2027/0178;
(Continued)

(56) References Cited

U.S. PATENT DOCUMENTS

2020/0241300 A1* 7/2020 Robinson ........... G02B 27/0172
2021/0004081 A1* 1/2021 Sugihara ................. G06F 3/013
2023/0042217 A1* 2/2023 Scales ................ G02B 27/0176

FOREIGN PATENT DOCUMENTS

JP 2018-41010 A 3/2018

OTHER PUBLICATIONS

International Search Report issued May 23, 2023 in PCT/JP2023/009935 filed Mar. 14, 2023, 4 pages (with English Translation).

* cited by examiner

*Primary Examiner* — Mihir K Rayan

(74) *Attorney, Agent, or Firm* — Oblon, McClelland, Maier & Neustadt, L.L.P.

(57) ABSTRACT

An identification system that identifies an eye-gaze area of a user includes a wearable device and a mobile device. The wearable device is an HMD that is worn on the head of the user and detects an orientation of the head of the user. The mobile device is worn on the body of the user separately from the wearable device. The mobile device includes an image capture device, an acquirer, and an identifier. The acquirer acquires first orientation information indicative of an orientation of the head of the user, the orientation being detected by the wearable device, and second orientation information indicative of an orientation of an optical axis of the image capture device. The identifier identified, based on the first and second orientation information acquired by the acquirer, an eye-gaze area of the user from an image captured by the image capture device.

8 Claims, 6 Drawing Sheets

(52) U.S. Cl.
CPC .............. *G06F 3/012* (2013.01); *G06F 3/013* (2013.01); *G02B 2027/0178* (2013.01); *G02B 2027/0187* (2013.01)

(58) Field of Classification Search
CPC ............ G02B 2027/0187; G02B 27/02; G02B 2027/014; G02B 2027/0138; G06F 3/012; G06F 3/013; G06F 3/011; G06F 3/01; G06F 3/01346; G06F 3/038; G06F 3/04815; G09G 5/00
See application file for complete search history.

IDENTIFICATION SYSTEM

TECHNICAL FIELD

This invention relates to identification systems for identifying an eye-gaze area gazed at by a user.

BACKGROUND ART

A generally known HMD (Head Mounted Display) device displays a real-world view overlaid with additional information, such as description about an object image. Patent Document 1 as prior art relates to a technique of such an HMD device. An HMD device disclosed in Document 1 displays on a display panel, a display image including additional image information received from a cloud server and an image captured by a camera. Upon reflection of the display image in the eyes of a user, the user visually recognizes the display image.

RELATED ART DOCUMENT

Patent Document

Patent Document 1: Japanese Patent Application Laid-Open No. JP 2018-41010

SUMMARY OF THE INVENTION

Problem to be Solved by the Invention

In recent years, eyeglass-type HMD devices have been proposed which include lenses through which incident light passes and which display an image indicative of additional information or other similar information on the lenses. It is anticipated that as the use of the eyeglass-type HMD devices will spread due to increase in demand for features (i) identifying an eye-gaze area within the real-world view that is gazed at by a user through an HMD device and (ii) displaying additional information or other similar information corresponding to the eye-gaze area.

If the HMD device is equipped with an image capture device that takes an image of the same quality as an image reflect in the eyes of the user, an eye-gaze area can be identified based on the image captured by the image capture device. However, (i) the HMD device may not be provided with such an image capture device due to constraints on weight, processing throughput, or power consumption. In addition, (ii) even if the HMD device is provided with an image capture device, the image quality of the image capture device may not be sufficient to identify an eye-gaze area. For the scenarios denoted by (i) and (ii), it is difficult to identify an eye-gaze area and provide features of display of additional information corresponding to the eye-gaze area.

Means for Solving the Problems

An identification system according to a preferred aspect of this disclosure includes a wearable device, an image capture device, an acquirer, and an identifier. The wearable device is worn on the head of the user and detects an orientation of the head of the user. The image capture device is worn on the body of the user separately from the wearable device. The acquirer acquires first orientation information indicative of an orientation of the head of the user, the orientation being detected by the wearable device, and second orientation information indicative of an orientation of an optical axis of the image capture device. The identifier identifies, based on the first and second orientation information, an eye-gaze area that is gazed at by the user within an image captured by the image capture device.

Effects of the Invention

According to this disclosure, an eye-gaze area gazed at by a user is identified by use of the image capture device worn on the body of the user separately from the HMD device. As a result, according to this disclosure, even if the HMD device is not provided with an image capture device, or even if the HMD device is provided with an image capture device with insufficient image quality, the eye-gaze area can be identified.

MODES FOR CARRYING OUT THE INVENTION

A. First Embodiment

A-1: Entire Configuration

Figure 1:
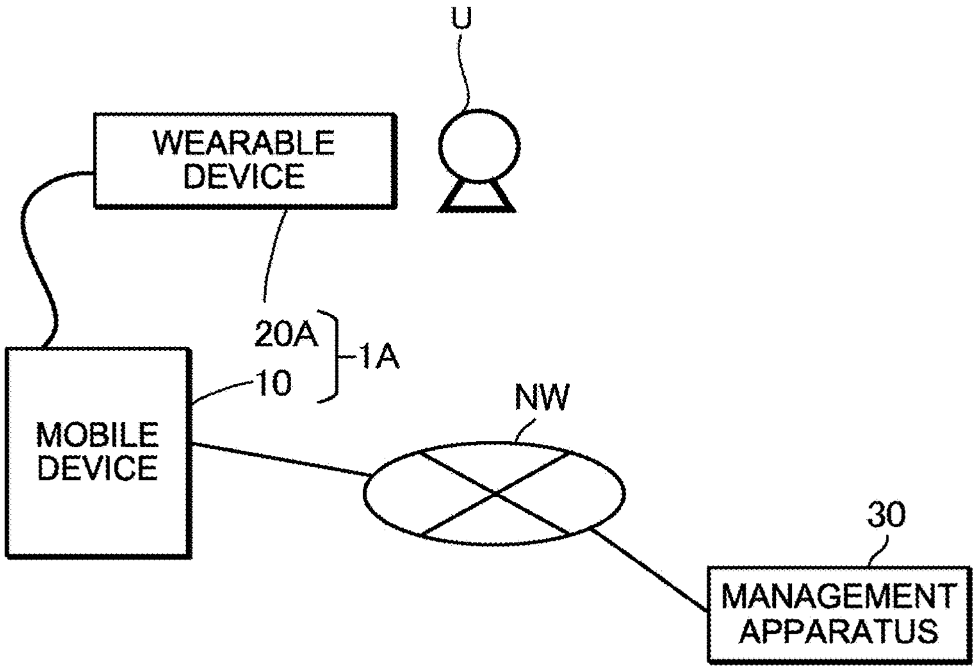
FIG. 1 is a block diagram illustrating an example of a configuration of an identification system 1A according to a first embodiment of this disclosure.

FIG. 1 is a block diagram illustrating an example of a configuration of an identification system 1 according to a first embodiment of this disclosure. As shown in FIG. 1, the identification system 1 includes a mobile device 10 and a wearable device 20A. The wearable device 20A is, for example, an eyeglass-type HMD device. The identification system 1 is an information system that provides features of (i) identifying an area within a real-world view that is gazed at by a user through the wearable device 20A, and (ii)

displaying an image corresponding to the eye-gaze area, specifically, additional information about the wearable device 20A.

Figure 2:
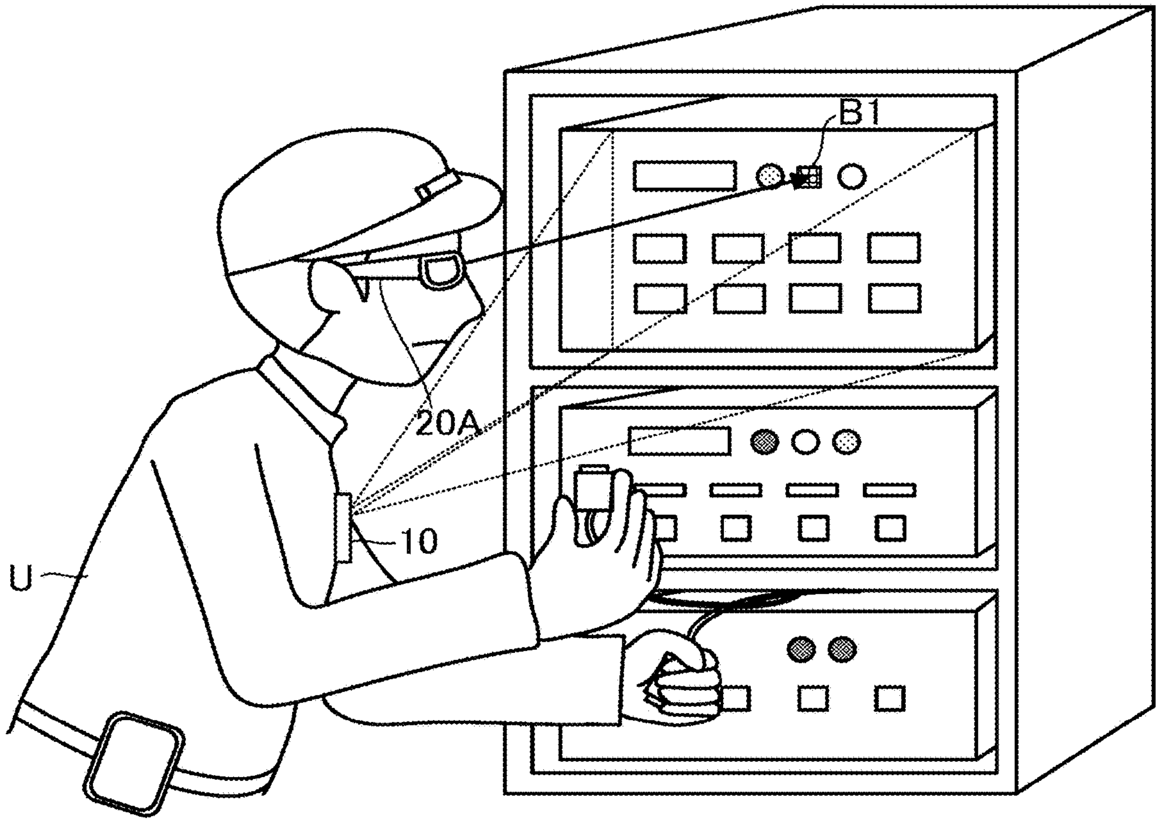
FIG. 2 is a diagram illustrating an example of how to use a mobile device 10 and a wearable device 20A included in an identification system 1A.

The mobile device 10 is, for example, a smartphone with a camera. The mobile device 10 is not limited to the smartphone, and it may be a tablet or a laptop computer. FIG. 2 is a diagram illustrating an example of how the mobile device 10 and the wearable device 20A are used. The wearable device 20A is worn on the head of the user U. The mobile device 10 is worn on the body of the user U separately from the wearable device 20A. The mobile device 10 is worn at a position other than the head of the user U, that is, at a position different from that of the wearable device 20A. In this embodiment, the mobile device 10 hangs around the neck of the user by a strap or the like, and the mobile device 10 is worn on the body of the user U. The mobile device 10 is connected to the wearable device 20A by wire. The mobile device 10 may be wirelessly connected to the wearable device 20A.

Figure 3:
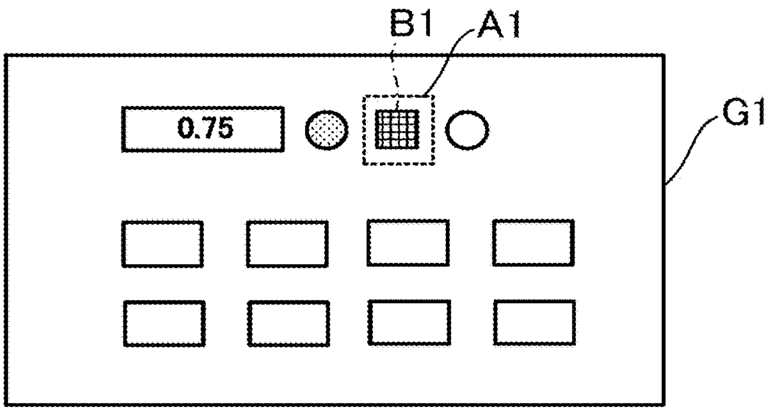
FIG. 3 is a diagram illustrating an example of an eye-gaze area A1 within an image G1 captured by a mobile device 10.

In this embodiment, the user U is, for example, a maintenance worker in a factory or other similar facility. As shown in FIG. 2, the user U wearing the mobile device 10 and the wearable device 20A is gazing at a two-dimensional (2D) barcode B1 attached to a gauge or other similar devices. In this situation, when an image G1 shown in FIG. 3 is captured by the mobile device 10, the image G1 is reflected in the eyes of the user U through the wearable device 20A. In more detail, due to a configuration of the wearable device 20A (HMD device) and a position at which an image is captured, an image reflected in the eyes of the user U is not identical to the image G1 captured by the mobile device 10. However, since a difference between the two images is negligibly small, the phrase "the image G1 is reflected in the eyes of the user U" is used.

The wearable device 20A according to this embodiment is not equipped with an image capture device (camera). However, the wearable device 20A detects the orientation of the face of the user U, which means the orientation the head of the user U. Details will be given below. The wearable device 20A is an example of a "wearable device" according to this disclosure. The orientation of the head of the user U wearing the wearable device 20A represents an orientation of an optical axis of the wearable device 20A. The orientation of the optical axis of the wearable device 20A refers to an orientation of the optical axis of a lens through which light from outside of the wearable device 20A passes. In this embodiment, an eye-gaze area A1 gazed at by the user U through the wearable device 20A is identified based on an orientation of the mobile device 10 and an orientation of the head of the user U detected by the wearable device 20A. The mobile device 10 reads the 2D barcode B1 from the eye-gaze area A1. The 2D barcode B1 indicates an identification information (ID) unique for the gauge to which the 2D barcode B1 is attached. The 2D barcode B1 is obtained by encoding the ID. The mobile device 10 decodes the 2D barcode B1 read from the eye-gaze area A1 to acquire the ID. The mobile device 10 transmits the acquired ID to a management apparatus 30 via a network NW.

The management apparatus 30 is a database server connected to the network NW. There is more than one gauge in the factory in which the user U operates. An ID of each gauge is associated with additional information relating to a corresponding gauge, and the additional information is stored in advance in the management apparatus 30. Specific examples of the additional information stored in the management apparatus 30 include a history of maintenance of a gauge, and a notice for maintenance thereof. Upon receiving an ID via the network NW, the management apparatus 30 transmits to the wearable device 20A, additional information corresponding to the received ID.

The mobile device 10 receives additional information from the managing apparatus 30 via the network NW. The mobile device 10 causes the wearable device 20A to display the additional information received from the managing apparatus 30. An image viewed by the user U through the wearable device 20A is an image obtained by overlaying a part of the image G1 captured by the wearable device 20A with an image representative of the additional information. The image representing additional information may be a character string, a symbol, a table, or a figure.

A-2: Mobile Device

Figure 4:
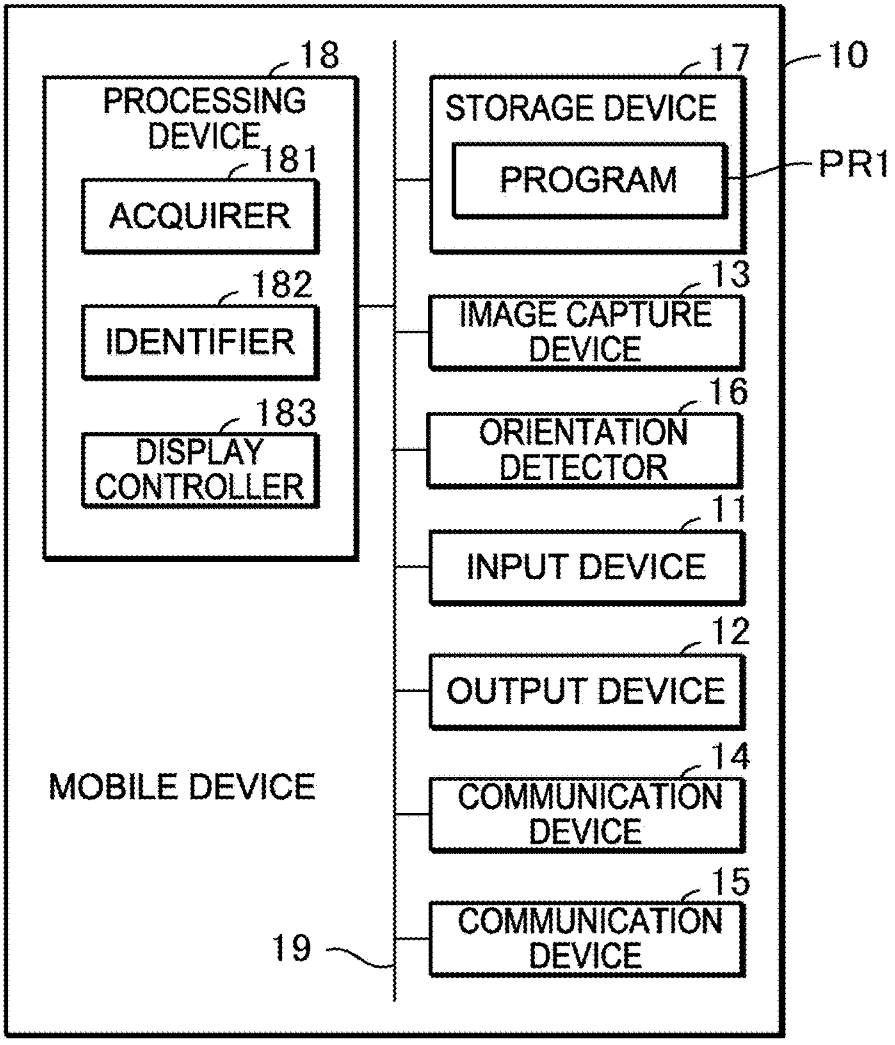
FIG. 4 is a block diagram illustrating an example of a configuration of the mobile device 10.

FIG. 4 is a block diagram illustrating an example of a configuration of the mobile device 10. As shown in FIG. 4, the mobile device 10 includes an input device 11, an output device 12, an image capture device 13, a communication device 14, a communication device 15, an orientation detector 16, a storage device 17, a processing device 18, and a bus 19. Components of the mobile device 10 (the input device 11, the output device 12, the image capture device 13, the communication devices 14 and 15, the orientation detector 16, the storage device 17, and the processing device 18) are connected to one another by the bus 19 that is used to transfer information. The bus 19 may be a single bus, or it may comprise different buses for each device.

The input device 11 includes a touch panel. The input device 11 may include more than one operation key in addition to the touch panel, or it may include more than one operation key without a touch panel. The input device 11 receives an input operation from the user U. The output device 12 includes a display. The touch panel of the input device 11 is on the display of the output device 12. The output device 12 displays a variety of types of information.

The image capture device 13 is, for example, a camera with an image sensor. The image capture device 13 captures a field of view of the image capture device under control of the processing device 18. The image capture device 13 outputs image data (or video) representative of the captured image to the processing device 18. In this embodiment, the image capture device 13 is disposed in the mobile device 10 such that an orientation of the image capture device 13 (i.e., an orientation of the optical axis of the image capture device 13) is identical to a normal orientation of a surface of the display of the output device 12.

The communication device 14 communicates with the management apparatus 30 via the network NW. The communication device 14 may communicate with the management apparatus 30 without passing the network NW. The communication device 15 communicates with the wearable device 20A by wire. The communication device 15 receives first orientation information from the wearable device 20A. The first orientation information indicates an absolute orientation of the head of the user U, specifically, an orientation of the head of the user U in a three-dimensional coordinate system fixed on the Earth (hereinafter, an absolute coordinate system). The communication device 15 outputs the first orientation information received from the wearable device 20A to the processing device 18. In addition, the communication device 15 transmits to the wearable device 20A, an image data received from the processing device 18. The communication device 15 may wirelessly communicate with the wearable device 20A.

Under control of the processing device 18, the orientation detector 16 detects the absolute orientation of the optical axis of the image capture device 13 (i.e., the orientation of the optical axis of the image capture device 13 in the absolute coordinate system) for each predetermined time. The orientation detector 16 outputs to the processing device 18, second orientation information indicative of the detected orientation. The orientation detector 16 includes a three-axis geomagnetic sensor and a three-axis acceleration sensor. The orientation detector 16 generates second orientation information based on (i) an orientation of magnetic north detected by the three-axis geomagnetic sensor and (ii) an orientation of the mobile device 10 detected by the three-axis acceleration sensor.

The storage device 17 is a recording medium readable by the processing device 18. The storage device 17 may comprise a non-volatile memory and a volatile memory. Examples of the non-volatile memory include a ROM (Read Only Memory), an EPROM (Erasable Programmable Read Only Memory), and an EEPROM (Electrically Erasable Programmable Read Only Memory). The volatile memory is, for example, a RAM (Random Access Memory). The storage device 17 stores a program PR1 that causes the processing device 18 to execute a method for identifying an eye-gaze area according to this disclosure.

The processing device 18 comprises one or more CPUs (Central Processing Units), which are examples of "one or more processors." The processors and CPUs are examples of a computer. The processing device 18 reads the program PR1 from the storage device 17. The processing device 18 executes the program PR1, to act as an acquirer 181, an identifier 182, and a display controller 183, as shown in FIG. 4. Thus, the acquirer 181, the identifier 182, and the display controller 183 shown in FIG. 4 are software modules implemented by operation of the processing device 18 in accordance with software.

The acquirer 181 acquires the first orientation information and the second orientation information. Specifically, the acquirer 181 acquires the second orientation information from the orientation detector 16. Furthermore, the acquirer 181 acquires the first orientational information by communicating with the wearable device 20A via the communication device 15. When the first orientation information is transmitted to the management apparatus 30 by the wearable device 20A and then is stored in the management apparatus 30, the acquirer 181 may acquire the first orientation information by communicating with the management apparatus 30 via the communication device 14.

The identifier 182 identifies an eye-gaze area gazed at by the user U with the image captured by the image capture device 13, based on the first orientation information acquired by the acquirer 181 and the second orientation information acquired by the same acquirer 181.

Figure 5:
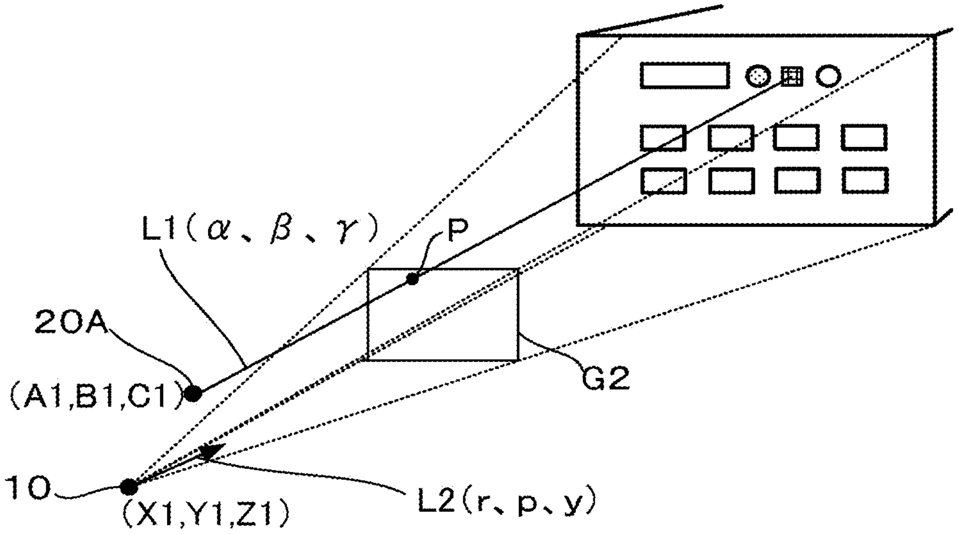
FIG. 5 is a diagram for explaining functions of an identifier 182.

In an example of FIG. 5, position coordinates of the mobile device 10 in the absolute coordinate system are denoted by (X1, Y1, Z1), and position coordinates of the wearable device 20A in the absolute coordinate system are denoted by (A1, B1, C1). Furthermore, an orientation of the head of the user U wearing the wearable device 20A (i.e., the absolute orientation of the optical axis L1 of the wearable device 20A worn on the head of the user U) is denoted by rotation angles (α, β, γ) around the respective coordinate axes in the absolute coordinate system. The absolute orientation of the optical axis L2 of the image capture device 13 is denoted by rotation angles (r, p, y) around the respective coordinate axes in the absolute coordinate system.

In an example of FIG. 5, an image G2 is used which is obtained by magnifying the image G1 based on a magnification of the lenses of the image capture device 13. The image G2 is an image at a position spaced apart from the position coordinates (X1, Y1, Z1) of the mobile device 10 by a focal length of the image capture device 13 along the optical axis L2. In the absolute position coordinate system, there is an intersection point P between the image G2 and a straight line, in which the straight line is along the optical axis L1 and passes through the position coordinates (A1, B1, C1) of the wearable device 20A. A position on the image G1 that corresponds to the intersection point P indicates the center of the eye-gaze area A1 (hereinafter, an eye-gaze position). The image G1 is defined based on the following (i) and (ii): (i) a distance from the image capture device 13 to a gauge or other similar devices serving as a subject, and (ii) an angle of view of the image capture device 13. Thus, under the assumption that a distance from the image capture device 13 to the subject is fixed, the image G2 is uniquely defined based on the image G1. The eye-gaze position is then identified based on the position coordinates (X1, Y1, Z1), the position coordinates (A1, B1, C1), the rotation angles (α, β, γ), and the rotation angles (r, p, y).

In this embodiment, the first orientation information indicates the rotation angles (α, β, γ). The second orientation information indicates the rotation angles (r, p, y). In this embodiment, a distance between the wearable device 20A and the image capture device 13 in the absolute coordinate system is about 30 cm. A distance from the image capture device 13 to the subject is generally about 3 m to 10 m. The distance between the wearable device 20A and the image capture device 13 is sufficiently less than the distance from the image capture device 13 to the subject. For this reason, even if the difference between the position coordinates (A1, B1, C1) of the wearable device 20A and the position coordinates (X1, Y1, 7.1) of the mobile device 10 is ignored (i.e., even if the distance is determined as X1=A1, Y1=B1, Z1=C1), the eye-gaze position can be approximately identified, and no particular issues arise. Considering such facts, the identifier 182 identifiers the eye-gaze position based on a difference (α−r, β−p, γ−y) between the rotation angles around the respective coordinate axes. Then, the identifier 182 identifies an eye-gaze area A1, which is an area centered on the identified eye-gaze position.

The display controller 183 causes the wearable device 20A to display an image corresponding to the eye-gaze area A1 identified by the identifier 182 (i.e., additional information). Specifically, the display controller 183 reads a 2D barcode B1 from the eye-gaze area A1 within the image G1. Next, the display controller 183 decodes the read 2D barcode B1 and convert it into identification data. Next, the display controller 183 transmits the ID obtained by decoding the 2D barcode B1 to the managing apparatus 30, to acquire additional information corresponding to the ID. Then, the display controller 183 transmits to the wearable device 20A via the communication device 15, image data indicative of an image obtained by overlaying the eye-gaze area A1 with the acquired additional information.

Figure 6:
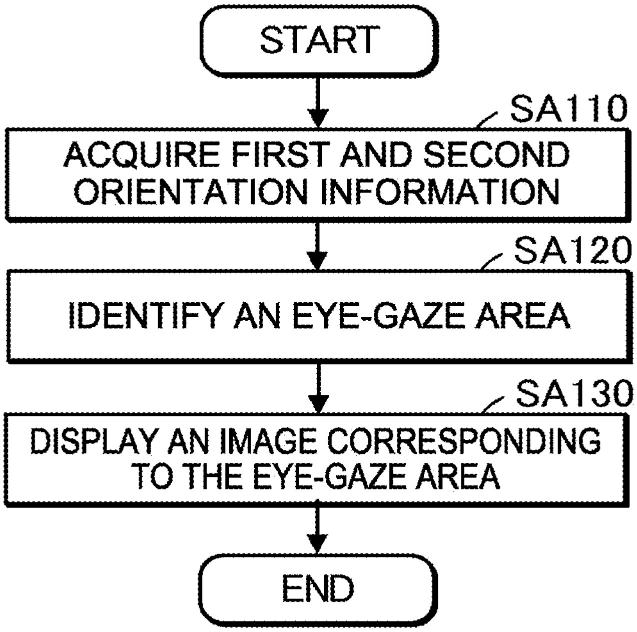
FIG. 6 is a flow chart of a method for identifying an eye-gaze area, which is executed by a processing device 18 of the mobile device 10 in accordance with a program PR1.

The processing device 18 operates in accordance with the program PR1 and executes a method for identifying an eye-gaze area according to this disclosure. FIG. 6 is a flowchart of the method for identifying an eye-gaze area. As shown in FIG. 6, the method includes steps SA110 to SA130.

At step SA110, the processing device 18 acts as the acquirer 181. At step SA110, the processing device 18 acquires second orientation information from the orientation detector 16. Furthermore, at step SA110, the processing device 18 acquires first orientation information by communicating with the wearable device 20A via the communication device 15.

At step SA120 following step SA110, the processing device 18 acts as the identifier 182. At step SA120, the processing device 18 identifies an eye-gaze area A1 based on the first and second orientation information acquired at step SA110.

At step SA130 following step SA120, the processing device 18 acts as the display controller 183. At step SA130, the processing device 18 causes the wearable device 20A to display an image (additional information) corresponding to the eye-gaze area A1 identified at step SA120.

A-3: Wearable Device

Figure 7:
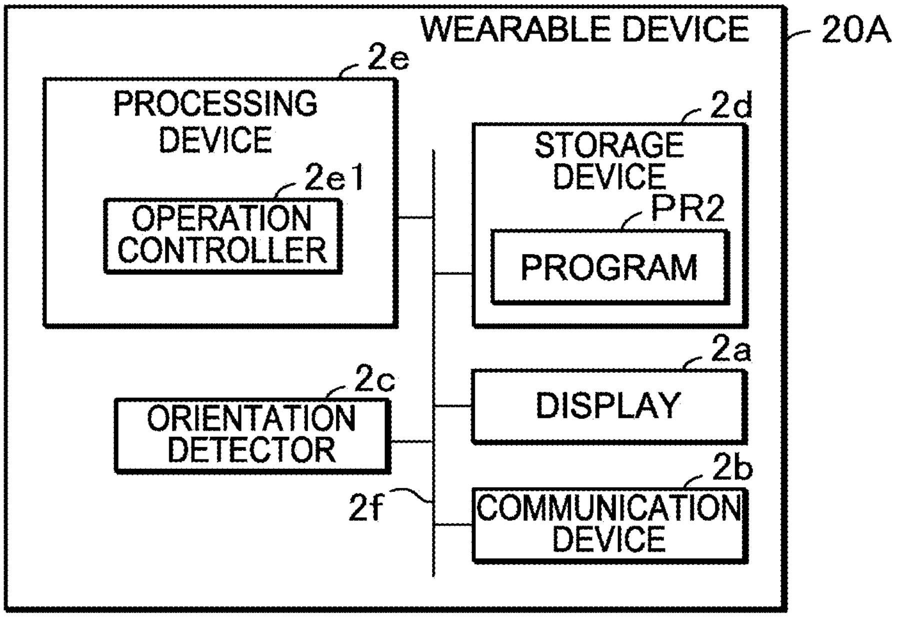
FIG. 7 is a block diagram illustrating a configuration of a wearable device 20A.

FIG. 7 is a diagram illustrating an example of a configuration of the wearable device 20A. The wearable device 20A includes a display 2*a*, a communication device 2*b*, an orientation detector 2*c*, a storage device 2*d*, a processing device 2*e*, and a bus 2*f*. Components of the wearable device 20A (the display 2*a*, the communication device 2*b*, the orientation detector 2*c*, the storage device 2*d*, and the processing device 2*e*) are connected with one another by a bus 2*f* that is used to transfer information. The bus 2*f* may be a single bus, or it may comprise different buses for each device.

The display 2*a* is of a light-transmit type. Incident light passing into the field of view of the wearable device 20 (display 2*a*) penetrates through the display 2*a*. The display 2*a* displays an image including an eye-gaze area A1 under control of the mobile device 10. When the user U wears the wearable device 20A, the display 2*a* is in front of the left and right eyes of the user U. An image representative of additional information corresponding to the eye-gaze area A1 is reflected in the eyes of the user U wearing the wearable device 20A.

Specifically, the display 2*a* includes a left-eye lens, a left-eye display panel, a left-eye optical member, a right-eye lens, a right-eye display panel, and a right-eye optical member. The left-eye and right-eye display panels are, for example, liquid crystal panels or organic EL (Electroluminescent) panels. The left-eye display panel displays an image represented by image data acquired from the mobile device 10. The left-eye optical member guides light emitted from the left-eye display panel to the left-eye lens. Similarly, the right-eye display panel displays an image represented by the image data acquired from the mobile device 10. The right-eye optical member guides light emitted from the right-eye display panel to the right-eye lens.

Each of the left-eye and right-eye lenses has a half-mirror. Light of the real-world view passes through the half-mirror of the left-eye lens and is guided to the left eye of the user U. Further, light guided by the left-eye optical member is incident in the left eye of the user U by the half-mirror of the left-eye lens. Light of the real-world view passes through the half-mirror of the right-eye lens and is guided to the right eye of the user U. Furthermore, light guided by the right-eye optical member is incident in the right eye of the user U by the half-mirror of the right-eye lens.

The communication device 2*b* communicates with the mobile device 10 by wire. The communication device 2*b* may also wirelessly communicate with the mobile device 10.

The orientation detector 2*c* detects an absolute orientation of the head of the user U for each predetermined period. The orientation detector 2*c* outputs first orientation information indicative of the detected orientation to the processing device 2*e*. The orientation detector 2*c* includes a three-axis geomagnetic sensor and a three-axis acceleration sensor, in a manner similar to that for the orientation detector 16. The orientation detector 2*c* generates first orientation information based on (i) an orientation of the magnetic north detected by the three-axis geomagnetic sensor and (ii) an orientation of the mobile device 10 detected by the three-axis acceleration sensor.

The storage device 2*d* is a recording medium readable by the processing device 2*e*. The storage device 2*d* may comprise a non-volatile memory and a volatile memory, as in similar to the storage device 17. The storage device 2*d* stores a program PR2. The processing device 2*e* comprises one or more CPUs. The processing device 2*e* reads the program PR2 from the storage device 2*d*. The processing device 2*e* acts as an operation controller 2*e*1 by executing the program PR2.

The operation controller 2*e*1 controls operations of the wearable device 20A. The operation controller 2*e*1 transmits first orientation information output from the orientation detector 2*c* to the mobile device 10 using the communication device 2*b*. As a result of this transmission, an absolute orientation of the head of the user U is transmitted to the mobile device 10. The operation controller 2*e*1 supplies to the display 2*a*, image data received from the mobile device 10 via the communication device 2*b*. The display 2*a* displays an image represented by the image data supplied from the operation controller 2*e*1.

Figure 8:
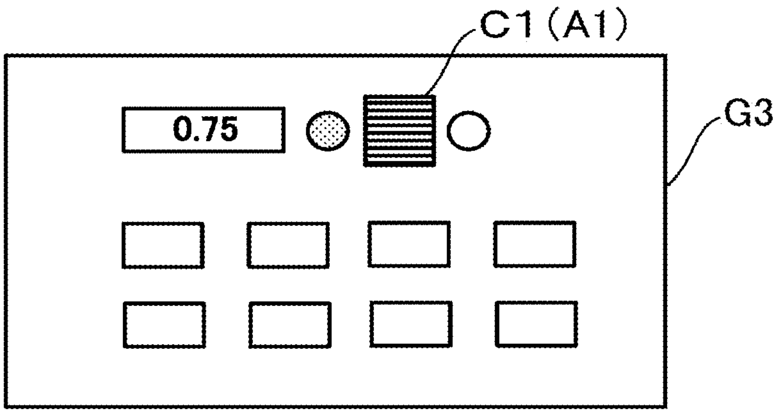
FIG. 8 is a diagram illustrating an example of an image G3 that is reflected in the eyes of a user U through the wearable device 20A.

In this embodiment, the image data indicative of an image corresponding to the eye-gaze area A1 is transmitted from the mobile device 10 to the wearable device 20A. Additional information corresponding to the eye-gaze area A1 is displayed on the display 2*a*. As a result, as shown in FIG. 8, an image G3 obtained by overlaying the image G1 with an image C1 is reflected in the eyes of the user U. The image C1 according to this embodiment is additional information corresponding to the eye-gaze area A1. The image C1 represents information of a gauge or other similar devices. Alternatively, the image C1 may represent a frame line along the eye-gaze area A1.

As will be clear from FIG. 7, the wearable device 20A is provided without an image capture device. However, according to this embodiment, by use of (i) the wearable device 20A without an image capture device and (ii) the image capture device 13 of the mobile device 10 worn by the body of the user separately from the wearable device 20A, it is possible to identify an eye-gaze area A1 of the user and cause the wearable device 20A to display an image corresponding to the identified eye-gaze area A1.

B: Second Embodiment

Figure 9:
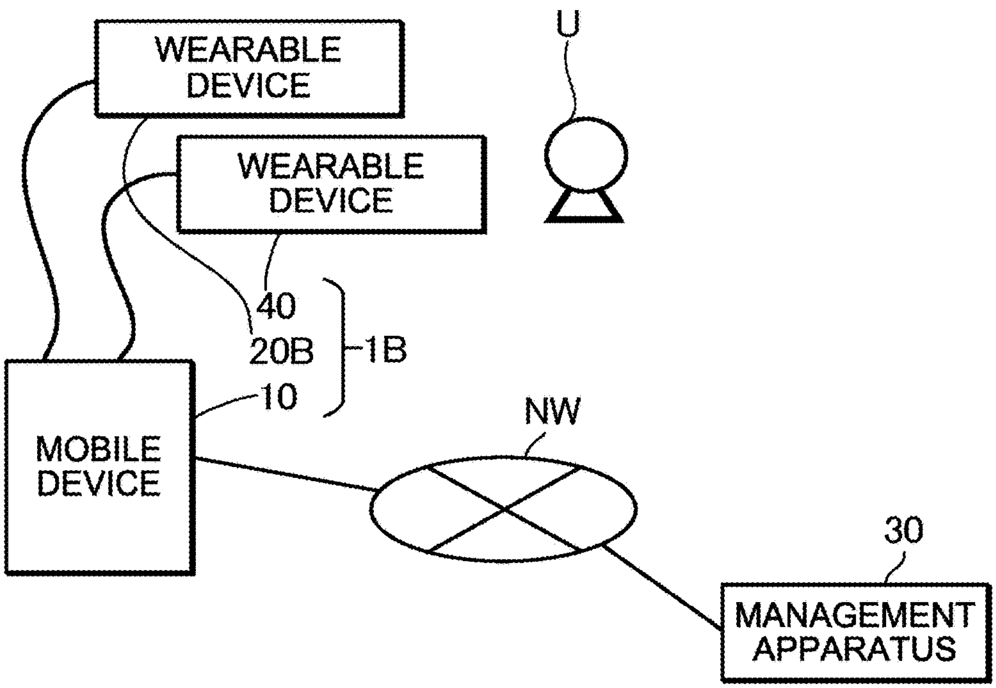
FIG. 9 is a block diagram illustrating a configuration of an identification system 1B according to a second embodiment of this disclosure.
Figure 10:
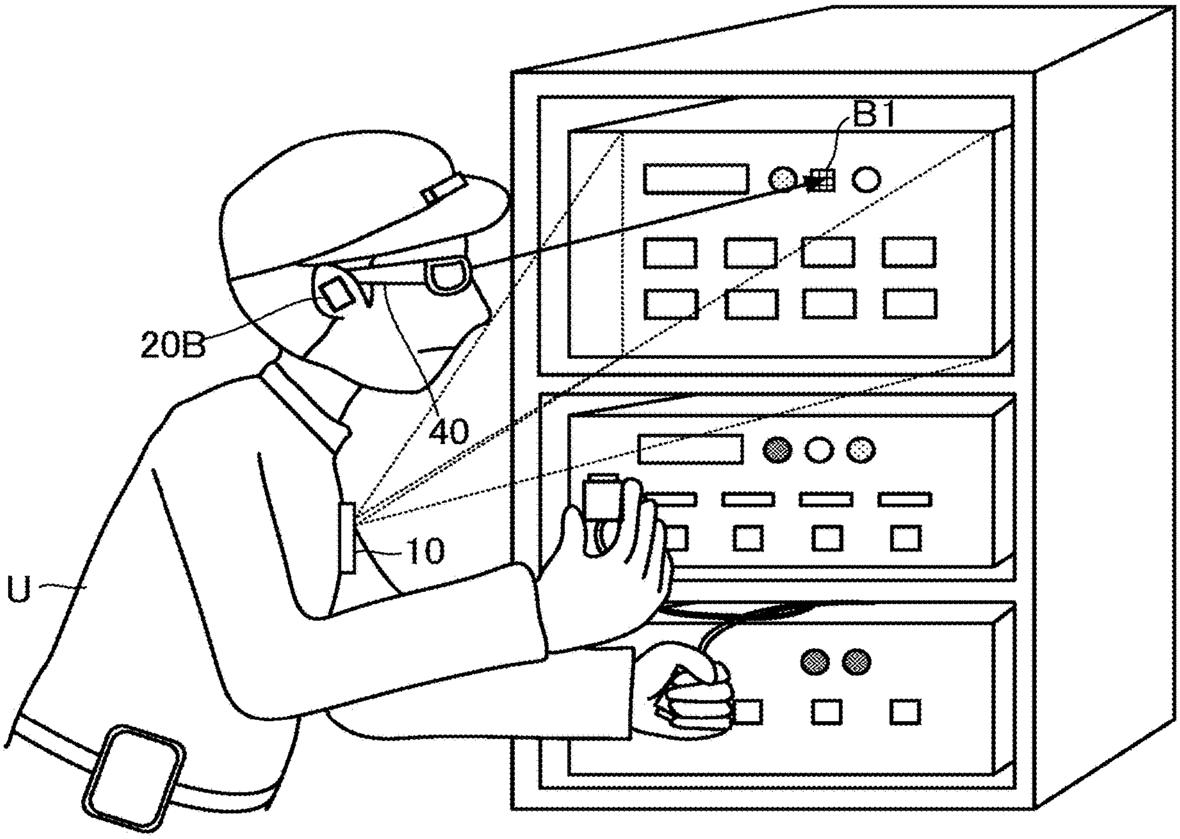
FIG. 10 is a diagram for explaining how to use the mobile device 10, and wearable devices 20B and 40, included in the identification system 1B.

FIG. 9 is a block diagram illustrating an example of a configuration of an identification system 1B according to a second embodiment of this disclosure. In FIG. 9, the same components as those in FIG. 1 are given the same reference signs. As will be clear from comparison of FIG. 9 with FIG. 1, the identification system 1B includes a wearable device 20B and a wearable device 40, in place of the wearable device 20A. In this regard, the identification system 1B differs from the identification system 1A. FIG. 10 is a diagram for explaining how to use the wearable devices 20B and 40, and the mobile device 10. As shown in FIG. 10, the mobile device 10 hangs around the neck of the user U by a strap or the like, in a manner similar to that of the first embodiment. The mobile device 10 is connected to the wearable devices 20B and 40 by wire.

Figure 11:
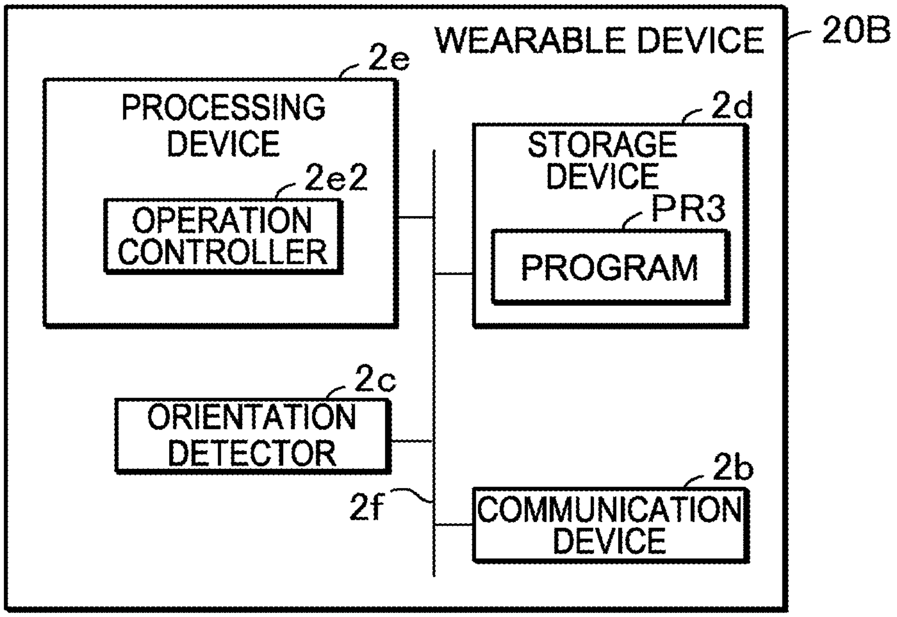
FIG. 11 is a block diagram illustrating a configuration of the wearable device 20B.

The wearable device 20B is an earphone type wearable device. As shown in FIG. 10, the wearable device 20B is worn on either ear of the user U. A pair of wearable devices 20B may be worn on both ears of the user U. FIG. 11 is a diagram illustrating an example of a configuration of the wearable device 20B. In FIG. 11, the same components as those in FIG. 7 are given the same reference signs. As will be clear from comparison of FIG. 11 with FIG. 7, there are two differences between the wearable devices 20B and 20A. The first difference is that the wearable device 20B is not provided with the display 2*a*. The second difference is that a program PR3 is stored in the storage device 2*d* of the wearable device 20B, in place of the program PR2.

The processing device 2*e* of the wearable device 20B operates in accordance with the program PR3 and acts as an operation controller 2*e*2. The operation controller 2*e*2 transmits first orientation information output from the orientation detector 2*c* to the mobile device 10 using the communication device 2*b*. Thus, the wearable device 20B is the same as the wearable device 20A in that an absolute orientation of the head of the user U is detected. The wearable device 20B is an example of a wearable device in this disclosure. Hereinafter, the wearable devices 20A and 20B are referred to as "wearable devices 20" as long as there is no need to distinguish between the wearable devices 20A and 20B.

In this embodiment, the mobile device 10 identifies an eye-gaze area based on first orientation information received from the wearable device 20B and second orientation information generated by the orientation detector 16. The mobile device 10 then transmits to the wearable device 40, image data indicative of an image (additional information) corresponding to the identified eye-gaze area.

Figure 12:
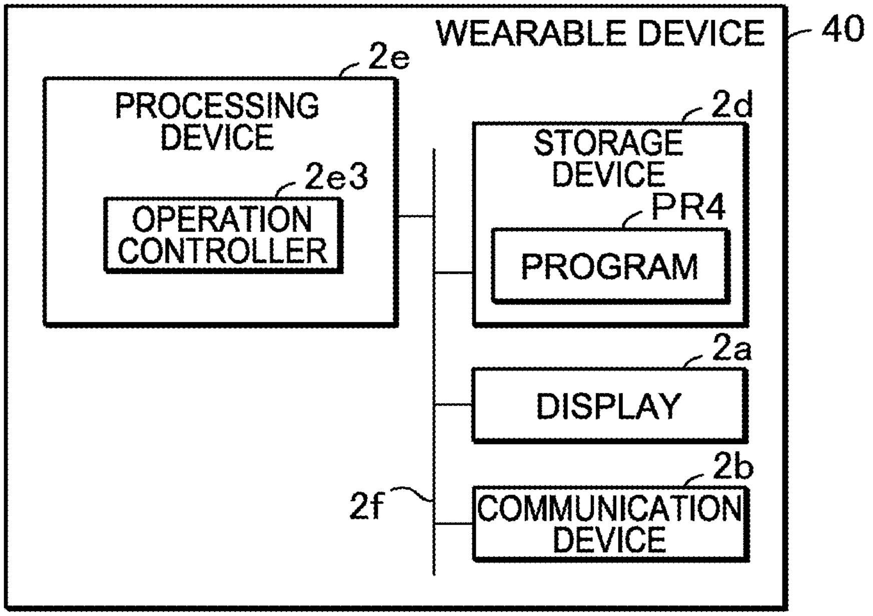
FIG. 12 is a block diagram illustrating an example of a configuration of the wearable device 40.

The wearable device 40 is an eyeglass-type HMD device in a manner similar to that for the wearable device 20A. As shown in FIG. 10, the wearable device 40 is worn on the head of the user U in a manner similar to the wearable device 20A. FIG. 12 is a block diagram illustrating an example of a configuration of the wearable device 40. In FIG. 12, the same components as those in FIG. 7 are given the same reference signs. As will be clear from comparison of FIG. 12 with FIG. 7, there are two differences between the wearable devices 40 and 20A. The first difference is that the wearable device 40 is not provided with the orientation detector 2*c*. The second difference is that a program PR4 is stored in the storage device 2*d* of the wearable device 40, in place of the program PR2.

The processing device 2*e* of the wearable device 40 operates in accordance with the program PR4 and acts as an operation controller 2*e*3. The operation controller 2*e*3 supplies to the display 2*a*, image data received from the mobile device 10 via the communication device 2*b*. Upon receipt of the supply, the display 2*a* displays an image (additional information) corresponding to an eye-gaze area of the user U. As a result, an image obtained by overlaying the real-world view with an image corresponding to the eye-gaze area is reflected in the eyes of the user U.

According to this embodiment, the following are used: (i) the wearable device 40 without an image capture device, (ii) the image capture device 13 of the mobile device 10 worn on the body of the user separately from the wearable device 40, and (iii) the wearable device 20B that detects an orientation of the head of the user U. By use of these components, it is possible to identify an eye-gaze area of the user U and cause the wearable device 40 to display additional information (an image corresponding to the identified eye-gaze area). The wearable device 20B according to this embodiment is an earphone-type wearable device. However, the wearable device 20B may be provided with a helmet or a hat to be worn by the user U. In short, the wearable device 20B only needs to detect an orientation of the head of the user U. In addition, it is sufficient to identify an eye-gaze area of the user U. When display of the additional information is unnecessary, the wearable device 40 and the display controller 183 may be omitted.

C: Modifications

This disclosure is not limited to the foregoing embodiments. Specific variations are as follows. Two or more embodiments freely selected from the following examples may be combined.

C-1: Modification 1

In the foregoing embodiments, an eye-gaze area is identified by ignoring a difference between position coordinates of the wearable device 20 and position coordinates of the mobile device 10; however, the eye-gaze area may be identified in consideration of such a difference. According to an aspect of identifying an eye-gaze area in consideration of the difference between the position coordinates of the wearable device 20 and the position coordinates of the mobile device 10, accuracy of identifying the eye-gaze area is improved as compared with the foregoing embodiments. It is noted that in order to identify the eye-gaze area by taking into consideration such a difference, the wearable device 20 may have a position detector that detects an absolute position of the wearable device 20, and the mobile device 10 may have a position detector that detects an absolute position of the mobile device 10. Examples of the position detector include a GPS (Global Positioning System) receiver, and a Global Positioning Satellite) receiver.

C-2: Modification 2

The orientation detector 16 according to the foregoing embodiments detects an absolute orientation of the optical axis L2 of the image capture device 13, and the wearable device 20 detects an absolute orientation of the head of the user U. However, either the orientation detector 16 or the orientation detector 2*c* of the wearable device 20 may be a sensor (hereinafter, a relative sensor) that detects a relative change in rotation angles of a three-axis acceleration sensor or a three-axis angular velocity sensor. For example, if the orientation detector 2*c* is a relative sensor, an absolute orientation of the head of the user U cannot be detected directly. However, even if the orientation detector 2*c* is a relative sensor, an absolute orientation of the head of the user U can be acquired after implementing calibration for initializing the orientation of the head of the user U relative to the optical axis L2 of the image capture device 13.

Examples of the calibration will be described below. At a position in a real space corresponding to the center of an image captured by the image capture device 13, the user U may be prompted to perform a predetermined input operation with the mobile device 10 being directed to the center of the field of view. Then, output of the orientation detector 16 when the predetermined input operation is performed may be stored in the mobile device 10 as initial orientation information. After the calibration is completed, the wearable device 20 may transmit the output of the orientation detector 2*c* to the mobile device 10. The mobile device 10 may store the sum of output values received after the calibration. The mobile device 10 may then convert the sum of the output values received after the calibration into rotation angles around the respective coordinate axes. The mobile device 10 may then calculate first orientation information based on (i) differences between the rotation angles and rotation angles indicated by the initial orientation information and (ii) a difference between second orientation information and the initial orientation information.

C-3: Modification 3

In the foregoing embodiments, the program PR1 is stored in the storage device 17 of the mobile device 10. The program PR1 may be manufactured or sold as a stand-alone product. Examples of a method for providing the program PR1 to suppliers at selling of the program PR1 include distribution of a computer-readable recording medium, such as a flash ROM in which program PR1 is written, and distribution of a recording medium downloaded via a network.

C-4: Modification 4

The acquirer 181, the identifier 182, and the display controller 183 according to the foregoing embodiments are implemented by software modules. However, one, some, or all of the acquirer 181, the identifier 182, and the display controller 183 may be implemented by hardware modules. Examples of a hardware module include a DSP (Digital Signal Processor), an ASIC (Application Specific Integrated Circuit), a PLD (Programmable Logic Device), and a FPGA (Field Programmable Gate Array).

C-5: Modification 5

In the foregoing embodiments, the mobile device 10 is provided with the acquirer 181, the identifier 182, and the display controller 183. However, the wearable device 20 or the management apparatus 30 may be provided with the acquirer 181, the identifier 182, and the display controller 183. Furthermore, although additional information (an image corresponding to the eye-gaze area) is displayed on the display 2*a*, the display 2*a* and the display controller 183 may be omitted if it is sufficient that only the eye-gaze area be identified. In other words, the identification system according to this disclosure may include (i) the wearable device that is worn on the head of the user and that detects an orientation of the head of the user, (ii) the image capture device that is worn on the body of the user separately from the wearable device, (iii) the acquirer, and (iv) the identifier. The acquirer acquires first orientation information indicative of an orientation of the head of the user detected by the wearable device and second orientation information indicative of an orientation of the optical axis of the image capture device. The identifier identifies, based on the first and second orientation information, an eye-gaze area within the image captured by the image capture device.

D: Other Matters (1) In the foregoing embodiments, the storage devices 17 and 2*d* are, for example, ROMs and RAMs. Examples of the storage devices 17 and 2*d* further include a flexible disk, an optical magnetic disk (e.g., a compact disk, a digital disk for multi-use, a Blu-ray (registered trademark), a smart card, a flash memory device (e.g., a card, a stick, a key drive), a CD-ROM (Compact Disc-ROM), a register, a removable disk, a hard disk, a floppy disk (registered trademark), a magnetic strip, a database, a server, and other appropriate storage medium.

(2) In the foregoing embodiments, the information, the signals, and the like described in the foregoing embodiments may be represented using any of a variety of different technologies. For example, data, an instruction, a command, information, a signal, a bit, a symbol, a chip, and the like that may be mentioned throughout the foregoing description may be represented by a voltage, a current, an electromagnetic wave, a magnetic field or a magnetic particle, an optical field or a photon, or a given combination thereof.

(3) In the foregoing embodiments, for example, input or output information may be stored in a specific location (e.g., a memory) or may be managed using a management table. For example, information to be input or output may be overwritten, updated, or additionally written. The output information may be deleted. The input information may be transmitted to another apparatus.

(4) In the foregoing embodiments, a determination may be made using a value (0 or 1) represented by one bit, may be made using a true or false value (Boolean), or may be made by a comparison between numerical values (e.g., a comparison with a predetermined value).

(5) The order of steps, sequences, and flowcharts exemplified in the foregoing embodiments may be changed as long as there is consistency. For example, the methods described in this disclosure are presented with elements of a variety of steps in an exemplary order. The methods are not limited to the presented order.

(6) Each function illustrated in FIGS. 4, 7, 11 and 12 is implemented by a given combination of at least one of hardware and software. A method of implementing each functional block is not particularly limited. Each functional block may be implemented using a physically or logically coupled single device or may be implemented using two or more devices that are physically or logically separated from each other, by connecting the two or more devices directly or indirectly (e.g., in a wired or wireless manner). Each functional block may be implemented by a combination of the single device or the two or more devices with software.

(7) The programs exemplified in the foregoing embodiments should be broadly construed to involve an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the programs are each called software, firmware, middleware, microcode, hardware description language, or another name.

For example, software, a command, and information may be transmitted and received via a transmission medium. When software is transmitted from a website, a server, or another remote source, using at least one of a wired technique (e.g., a coaxial cable, a fiber optic cable, a twisted pair cable, a digital subscriber line (DSL)) and a wireless technique (e.g., an infrared ray, a microwave), at least one of the wired technique and the wireless technique is included within the definition of the transmission medium.

(8) In the foregoing embodiments, the terms "system" and "network" are used in an interchangeable manner.

(9) The information and parameters described in this disclosure may be represented using an absolute value, may be represented using a relative value from a predetermined value, or may be represented using other corresponding information.

(10) In the foregoing embodiments, examples of the mobile device include a mobile station (MS). The mobile station may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or another suitable term by one skilled in the art. In this disclosure, for example, the terms "mobile station," "user terminal," "user equipment (UE)," and "terminal" may be used in an interchangeable manner.

(11) In the foregoing embodiments, the terms "connected" and "coupled, or other given modifications of these terms can refer to any direct or indirect connection or coupling between two or more elements, and the terms can involve the presence of one or more intermediate elements between two elements that are "connected" or "coupled" together. A coupling or connection between elements may be a physical coupling or connection, may be a logical coupling or connection, or may be a combination thereof. For example, the term "connection" may be read as "access." It can be appreciated in this disclosure that two elements are "connected" or "coupled" together using at least one of one or more electric wires, one or more cables, and one or more printed electrical connections and using, as some non-limiting and non-comprehensive examples, electromagnetic energy at wavelengths in a radio frequency range, a microwave range, and an optical (both visible and invisible) range.

(12) In the foregoing embodiments, "based on" does not involve "based only on" unless otherwise specified. In other words, the phrase "based on" involves both "based only on" and "based at least on".

(13) The term "determining" as used in this disclosure may involve a variety of different operations. The term "determining" may involve "judging", "calculating", "computing", "processing", "deriving", "investigating" "looking up, searching for, making an inquiry (e.g., searching a table, a database, or another data structure), and "ascertaining" to be regarded as "determining." The term "determining" may involve "receiving" (e.g., receiving information), "transmitting" (e.g., transmitting information), "inputting", "outputting", and "accessing" (e.g., accessing data in a memory) to be regarded as "determining." The term "determining" may involve "resolving", "selecting", "choosing", "establishing", and "comparing" to be regarded as "determining." That is, the term "determining" may involve a given sort of action to be regarded as "determining." The term "determining" may be read as "assuming", "expecting", or "considering."

(14) In the foregoing embodiments, the terms "include" and "including" as well as transformations of these terms are intended to be open-ended as in the term "comprising." The term "or" as used in this disclosure is not intended to be an exclusive OR.

(15) In this disclosure, for example, a singular feature, element, or step preceded with an article such as "a", "an", or "the" in the English translation may be understood as including plural features, elements, or steps.

(16) In this disclosure, the phrase "A and B differ" may refer to "A and B being different from each other." This phrase may also refer to "each of A and B being different from C." For example, the terms "separate" and "couple" may be understood to mean "differ."

(17) The foregoing embodiments and modifications according to this disclosure may be used alone, may be used in combination, or may be used in a switchable manner in accordance with implementation. Notification of predetermined information (e.g., notification about "being X") is not necessarily made explicitly, and may be made implicitly (e.g., the predetermined information is not notified).

E: Aspects Derived from the Foregoing Embodiments and Modifications

Although description has been given of this disclosure, it will be clear to those skilled in the art that this disclosure is not limited to the foregoing embodiments. This disclosure can be implemented as modifications and variations without departing from the spirit and scope of this disclosure as claimed in the claims. Description in this disclosure is intended to be illustrative, and it is not limited to this disclosure. The following aspects are derived from at least one of the foregoing embodiments or modifications.

An identification system according to a first aspect includes a wearable device 20, an image capture device 13, an acquirer 181, and an identifier 182. The wearable device 20 is worn on the head of the user U. The wearable device 20 detects an orientation of the head of the user U. The image capture device 13 is worn on the body of the user U separately from the wearable device 20. The acquirer 181 acquires first orientation information indicative of an orientation of the head of the user U, the orientation being detected by the wearable device 20, and second orientation information indicative of an orientation of the optical axis L2 of the image capture device 13. The identifier 182 identifies, based on the first and second orientation information, an eye-gaze area A1 that is gazed at by the user U within the image captured by the image capture device 13.

According to the identification system of the first aspect, even if the wearable device 20 is not provided with an image capture device, the eye-gaze area A1 within the image captured by the image capture device 13 can be identified by using the image capture device 13 separately from the wearable device 20. Furthermore, according to the identification system of the first aspect, even if the wearable device 20 is provided with an image capture device with image quality insufficient for identifying the eye-gaze area, the eye-gaze area A1 can be identified. In this embodiment, the mobile device 10 with the image capture device 13 is worn on the body of the user U. However, in a manner similar to that of the first aspect, the image capture device 13 may be worn on the body of the user U.

In a second aspect (an example of the first aspect), the wearable device 20 may include a display **2*a*. Examples of the wearable device 20 with the display 2*a* include a wearable device 20A. The identification system according to the second aspect may further include a display controller 183. The display controller 183 displays on the display 2*a*, an image including the eye-gaze area A1 identified by the identifier 182. According to the identification system of the second aspect, by use of the image capture device 13 separately from the wearable device 20, it is possible to identify an eye-gaze area A1 within the image captured by the image capture device 13** and display the image corresponding to the eye-gaze area A1.

The identification system according to a third aspect (an example of the first aspect) may identify the eye-gaze area A1 by ignoring a difference between a position of the image capture device 13 and a position of the wearable device 20.

When the wearable device 20 and the image capture device 13 are worn on the body of the user U, a distance from the wearable device 20 to the image capture device 13 is sufficiently less than a distance between the image capture device 13 and the subject. As a result, in a situation in which the wearable device 20 and the image capture device 13 are worn on the body of the user U, and even if the eye-gaze area A1 is identified by ignoring the difference between the position of the wearable device 20 and the position of the image capture device 13, no particular issues arise. According to the identification system of the third aspect, the eye-gaze area A1 within the image captured by the image capture device 13 can be identified without using a sensor that detects a position of the wearable device 20 and a sensor that detects a position of the image capture device 13.

The identification system according to a fourth aspect (an example of the first aspect) may identify the eye-gaze area A1 by defining (i) a distance from the image capture device 13 to the subject, as being fixed, and (ii) an angle of view of the image capture device 13 as being fixed.

According to the identification system of the fourth aspect, the eye-gaze area A1 within the image captured by the image capture device 13 can be identified without using a sensor that detects a distance from the image capture device 13 to the subject, and a sensor that detects an angle of view of the image capture device 13.

DESCRIPTION OF REFERENCE SIGNS 1A, 1B . . . identification system, 10 . . . mobile device, 20, 20A, 20B, 40 . . . wearable device, 11 . . . input device, 12 . . . output device, 13 . . . image capture device, 14, 15, 2*b* . . . communication device, 16, 2*c* . . . orientation detector, 17, 2*d* . . . storage device, 18, 2*e* . . . processing device, 181 . . . acquirer, 182 . . . identifier, 183 . . . display controller, 19, 2*f* . . . bus, 2*a* . . . display, 2*e*1, 2*e*2, 2*e*3 . . . operation controller, PR1, PR2, PR3, PR4 . . . program.

The invention claimed is:

1. An identification system comprising:

a wearable device that is worn on head of a user and is configured to detect an orientation of the head of the user; and a mobile device that is worn on body of the user separately from the wearable device, wherein the mobile device includes:

an image capture device; and processing circuitry configured to:

acquire:

first orientation information indicative of an orientation of the head of the user, the orientation being detected by the wearable device; and second orientation information indicative of an orientation of an optical axis of the image capture device; and identify, based on the first and second orientation information, an eye-gaze area that is gazed at by the user within an image captured by the image capture device, wherein the first orientation information indicates rotation angles of the wearable device in an absolute coordinate system, wherein the second orientation information indicates rotation angles of the image capture device in the absolute coordinate system, and wherein the processing circuitry of the mobile device is configured to identify the eye-gaze area based on subtracting the rotation angles of the wearable device from the rotation angles of the image capture device.

2. The identification system according to claim 1, wherein:

the wearable device includes a display, the processing circuitry of the mobile device is configured to display an image corresponding to the eye-gaze area on the display.

3. The identification system according to claim 1, wherein the processing circuitry of the mobile device is configured to identify the eye-gaze area by ignoring a difference between a position of the image capture device and a position of the wearable device.

4. The identification system according to claim 1, wherein the processing circuitry of the mobile device is configured to identify the eye-gaze area by defining:

a distance from the image capture device to a subject, as being fixed; and an angle of view of the image capture device as being fixed.

5. The identification system according to claim 1, wherein the mobile device is worn on a front side of the body of the user and separately from the wearable device.

6. The identification system according to claim 5, wherein the mobile device is a smartphone.

7. The identification system according to claim 1, wherein the wearable device is an earphone wearable device.

8. The identification system according to claim 2, wherein the eye-gaze area gazed at by the user includes a two-dimensional barcode, and wherein the image corresponding to the eye-gaze area displayed on the display presents additional information based on the two-dimensional barcode.

* * * * *